US010134005B2

(12) United States Patent
Labuschagne

(10) Patent No.: US 10,134,005 B2
(45) Date of Patent: Nov. 20, 2018

(54) INVENTORY MANAGEMENT

(71) Applicant: FULL FACING (PTY) LTD, Bellville (ZA)

(72) Inventor: Adriaan Zagarias Albertus Labuschagne, Bellville (ZA)

(73) Assignee: FULL FACING (PTY) LTD, Bellville (ZA)

( * ) Notice: Subject to any disclaimer, the term of this patent is extended or adjusted under 35 U.S.C. 154(b) by 0 days.

(21) Appl. No.: 15/309,599

(22) PCT Filed: Sep. 22, 2014

(86) PCT No.: PCT/IB2014/064739
§ 371 (c)(1),
(2) Date: Nov. 8, 2016

(87) PCT Pub. No.: WO2016/046596
PCT Pub. Date: Mar. 31, 2016

(65) Prior Publication Data
US 2017/0185952 A1    Jun. 29, 2017

(51) Int. Cl.
*G06Q 10/08* (2012.01)
*G06Q 20/20* (2012.01)

(52) U.S. Cl.
CPC ........... *G06Q 10/087* (2013.01); *G06Q 20/20* (2013.01); *G06Q 20/203* (2013.01)

(58) Field of Classification Search
CPC ..... G06Q 10/087; G06Q 20/20; G06Q 20/203
USPC ........................................................ 235/385
See application file for complete search history.

(56) References Cited

U.S. PATENT DOCUMENTS

| | | | | |
|---|---|---|---|---|
| 4,521,677 A * | 6/1985 | Sarwin | ..................... | G06F 3/147 235/383 |
| 4,766,295 A * | 8/1988 | Davis | ...................... | A47F 10/02 235/383 |
| 5,465,085 A * | 11/1995 | Caldwell | ................. | G06F 3/147 235/383 |
| 5,671,362 A * | 9/1997 | Cowe | ................... | G06Q 10/087 340/5.92 |
| 5,854,476 A * | 12/1998 | Goodwin, III | ............ | G09F 9/00 235/383 |
| 6,213,341 B1 * | 4/2001 | Keith, III | ................. | G07D 1/00 221/131 |

(Continued)

FOREIGN PATENT DOCUMENTS

WO    2014047272 A1    3/2014

*Primary Examiner* — Claude J Brown
(74) *Attorney, Agent, or Firm* — Avery N. Goldstein; Blue Filament Law, PLLC

(57) ABSTRACT

An inventory monitoring system (10) is provided, which includes a number of merchandise detectors (12) that each include a number of sensors that are configured to detect the presence or absence of products in a predetermined merchandise position, a position on a shelf in a retail space, and to emit a detect signal confirming such presence or absence. Each of the merchandise detectors (12) also includes a rear unit (28) with a transmitter that is connected to the sensor and that transmits the detect signal. The system (10) includes one or more gateway device (36,40) that receives the detect signals from the merchandise detectors (12) and compiles a merchandise data signal from the detect signals, and transmits it a computer (42) to be used in monitoring and managing inventory.

23 Claims, 2 Drawing Sheets

(56) References Cited

U.S. PATENT DOCUMENTS

| | | | |
|---|---|---|---|
| 6,542,079 B1 | 4/2003 | Kahl, Sr. | |
| 7,872,588 B2 | 1/2011 | Potter et al. | |
| 8,676,377 B2 | 3/2014 | Siegel et al. | |
| 8,725,290 B2 * | 5/2014 | Templer | G07F 9/026 221/279 |
| 9,694,488 B2 * | 7/2017 | Savage | B25H 3/00 |
| 2003/0047654 A1 * | 3/2003 | Johansson | A47G 1/175 248/205.3 |
| 2003/0136832 A1 * | 7/2003 | Massaro | A47F 5/0068 235/383 |
| 2005/0040123 A1 * | 2/2005 | Ali | A47F 1/126 211/59.3 |
| 2005/0168345 A1 * | 8/2005 | Swafford, Jr. | A47F 1/126 340/686.1 |
| 2007/0273513 A1 * | 11/2007 | White | G07F 9/026 340/568.8 |
| 2009/0248198 A1 * | 10/2009 | Siegel | G06Q 10/08 700/231 |
| 2009/0319399 A1 * | 12/2009 | Resta | G06Q 10/00 705/28 |
| 2013/0002422 A1 * | 1/2013 | Wiese | G08B 13/1654 340/539.1 |
| 2013/0117053 A2 | 5/2013 | Campbell | |
| 2013/0332271 A1 * | 12/2013 | Hay | G06Q 20/20 705/14.51 |
| 2014/0316916 A1 * | 10/2014 | Hay | G06Q 20/18 705/17 |
| 2016/0264394 A1 * | 9/2016 | Hershberger | B67D 1/0801 |

* cited by examiner

INVENTORY MANAGEMENT

FIELD OF THE INVENTION

This invention relates to inventory management in retail, including merchandising, and it also relates to inventory management in the supply chain to retail. In particular, the invention relates to an inventory monitoring system, a merchandise detector, a method of inventory management and software for inventory management.

The term "merchandising" as used herein refers to the practice of making products (inventory/stock) available for sale in retail outlets—primarily by stocking shelves and displays.

BACKGROUND TO THE INVENTION

Management of inventory or stock in retail outlets and in supply chains to retail, have been studied extensively and various inventory management philosophies have been developed to maximise profits, including: merchandising, optimisation of stock costs and replenishment costs, inventory forecasting, and the like. However, the implementation of these philosophies requires up to date (ideally real-time) data relating to stock levels in the retail outlet and supply chain, as well as merchandising data.

There is resistance in retail outlets, against installation of additional equipment in the retail environment, because of perceptions that it could clutter the retail environment, could be unsightly, could inhibit display modification, and the like. The resistance to installation of additional equipment results largely from resistance to wiring and to visible equipment.

The present invention seeks to allow inventory management in retail and the retail supply chain in a cost-effective manner, with comprehensive up to date data, including stock levels and merchandising data. The invention also seeks to minimise visual impact of inventory monitoring equipment in retail, and to avoid dependence on power supplies in retail.

SUMMARY OF THE INVENTION

According to one aspect of the present invention there is provided an inventory monitoring system which comprises:
 a plurality of merchandise detectors, each of said merchandise detectors comprising at least one sensor that is configured to detect the presence or absence of products in a predetermined merchandise position and to emit a detect signal confirming such presence or absence, and each of said merchandise detectors including a transmitter connected to the sensor and configured to transmit the detect signal; and
 at least one gateway device with a receiver that is configured to receive the detect signals from the merchandise detectors, and a transmitter that is configured to compile a merchandise data signal from the detect signals, and to transmit said merchandise data signal.

Each merchandise detector may include an elongate array of the sensors, e.g. the sensors may be spaced apart in line and may be disposed on a display, to detect the presence or absence of products in a row extending backwards from a facing of the products.

Each merchandise detector may include a receiver that is configured to receive detect signals from other of said merchandise detectors; and the gateway device and merchandise detectors may be configured to communicate with one another as a wireless sensor network (WSN).

The gateway devices may include one or more router and/or a coordinator and may include one or more computers that are configured to receive and process the merchandise data signal. The computer may be configured to compile merchandise data from the merchandise data signal, and to make the merchandise data available for display, analysis, further processing and/or storage.

The monitoring system may include a plurality of the computers that are connected to one another by a communications network and one or more of the computers may be at different locations.

According to another aspect of the present invention there is provided a merchandise detector which comprises:
 a base layer;
 a plurality of proximity sensors fitted on the base layer in an elongate array, each said proximity sensor being configured to detect the presence or absence of an object on one side of the base layer and to emit a detect signal confirming such presence or absence;
 electronic circuitry connected to the sensors to receive the detect signals from the sensors; and
 a transmitter connected to the electronic circuitry and configured to transmit the detect signals.

The transmitter is preferably a radio transmitter.

The base layer is preferably releasably attachable to a substrate such as a shelf and the merchandise detector may include a flexible sheet that is configured to cover the base layer at least in part, the flexible sheet being releasably attachable to the substrate, e.g. with releasable adhesive, magnetically, or the like. The merchandise detector may includes more than one of the flexible sheets and at least two of them may be releasably attachable to the substrate by different means.

The base layer may a printed circuit board and the proximity sensors may be photosensors, e.g. reverse-biased light emitting diodes (LEDs) that act as photodiodes.

The electronic circuitry of the merchandise detector may be configured to compile a merchandise detector signal from the detect signals and to transmit the detect signals in the form of the complied merchandise detector signal.

According to a further aspect of the present invention there is provided a method of inventory management, said method comprising:
 monitoring the presence or absence of products in predetermined merchandise positions, in a plurality of merchandise detectors;
 emitting a detect signal from each merchandise detector, said detect signal confirming such presence or absence;
 receiving the detect signals from the merchandise detectors in at least one gateway device;
 compiling a merchandise data signal;
 transmitting the merchandise data signal from the gateway device; and
 receiving said merchandise data signal in at least one computer.

The method may include monitoring the presence or absence of products in an array of predetermined merchandise positions, e.g. in a row on a display shelf, in one or more of the merchandise detectors.

The gateway device and merchandise detectors may communicate with one another as a wireless sensor network.

The method may include compiling merchandise data from the merchandise data signal, and: displaying the merchandise data on a user interface, processing the merchandise data to generate prompts, storing the merchandise data, or the like. The prompts generated may be displayed on one or more user interfaces, e.g. the user interfaces of the computers.

The invention extends to inventory management software, said software being loadable onto a processor of a computer and said software comprising instructions for implementing a method of inventory management as described herein above.

BRIEF DESCRIPTION OF THE DRAWINGS

For a better understanding of the present invention, and to show how it may be carried into effect, the invention will now be described by way of non-limiting example, with reference to the accompanying drawings in which.

DETAILED DESCRIPTION OF THE DRAWINGS

Figure 1:
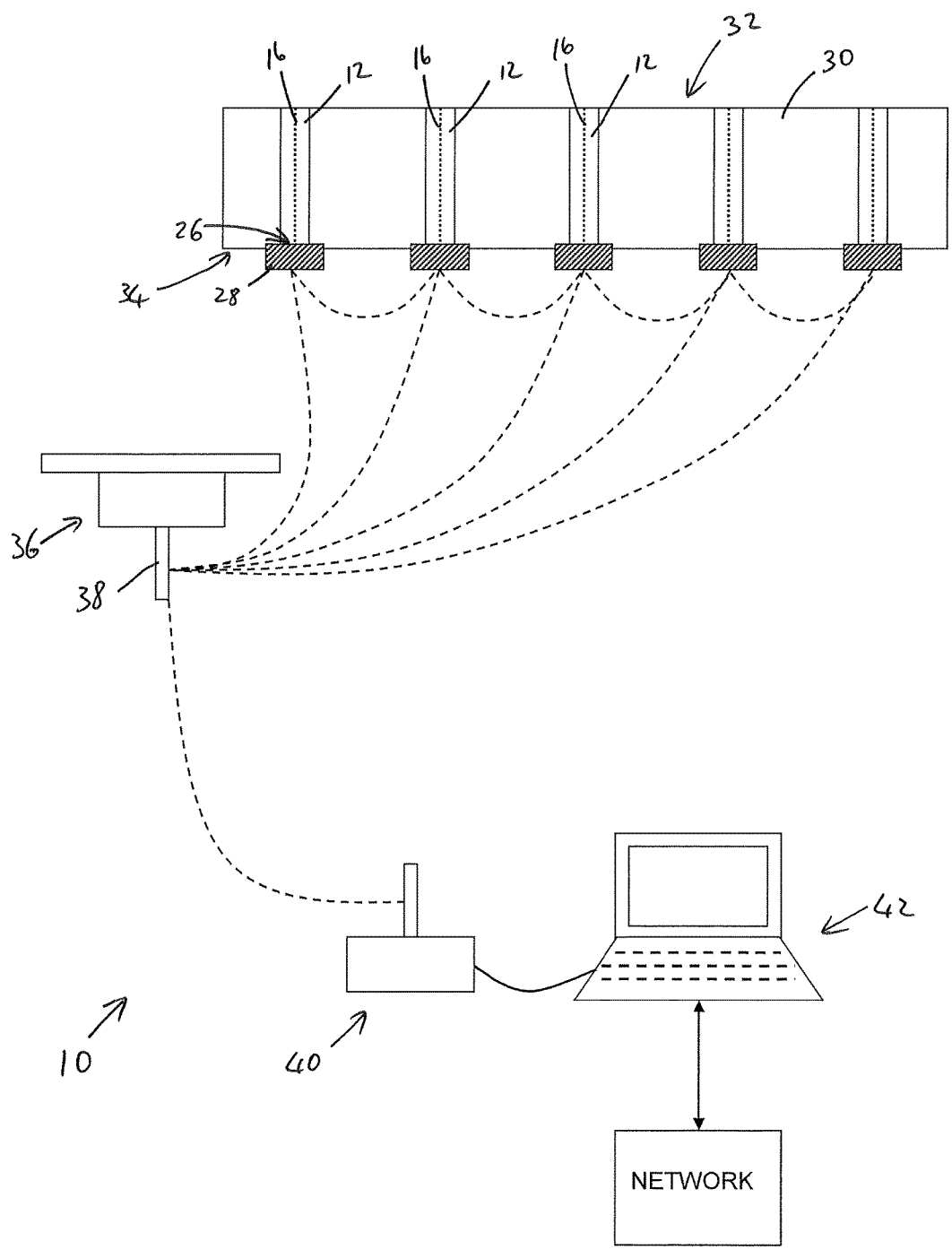
FIG. 1 is a schematic representation of elements of an inventory monitoring system according to the present invention.

Referring to the drawings, an inventory monitoring system according to the present invention is generally identified by reference number 10 and a merchandise detector according to the invention is generally identified by reference number 12.

Figure 2:
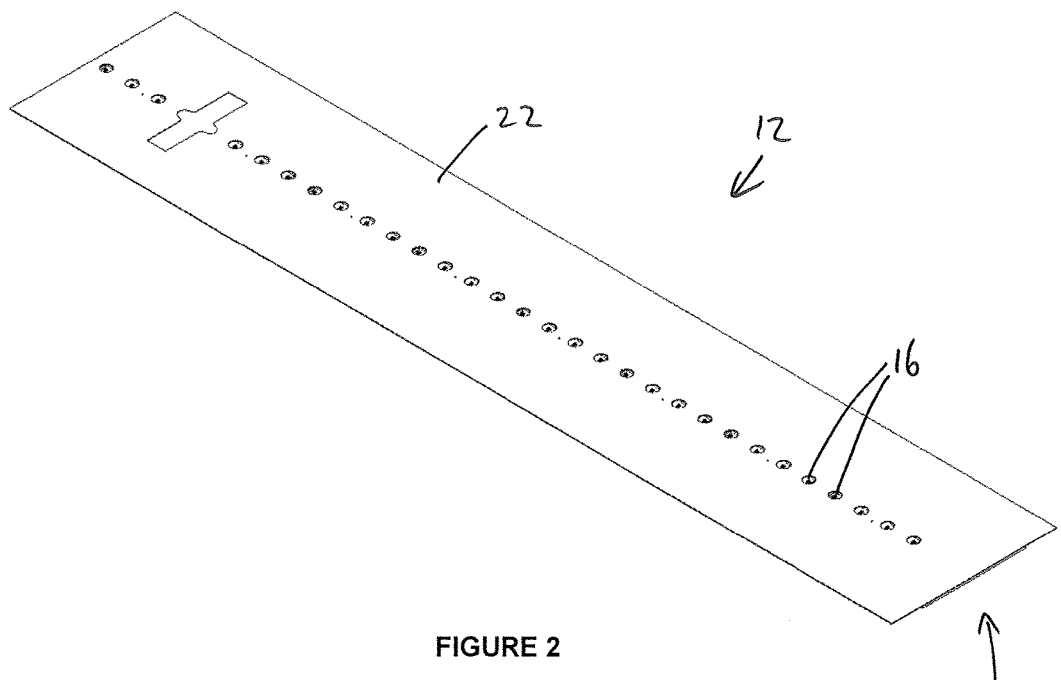
FIG. 2 is a three-dimensional view of a merchandise detector of the system of FIG. 1.
Figure 3:
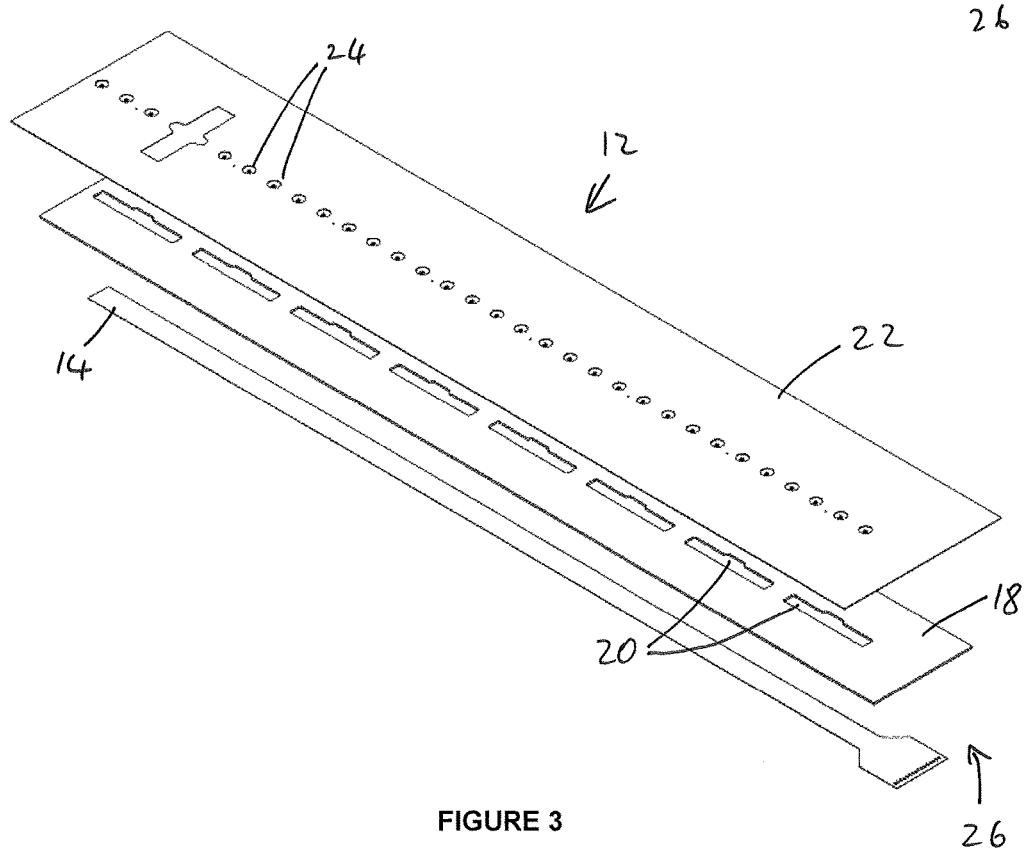
FIG. 3 is an exploded three-dimensional view of the merchandise detector of FIG. 2.

Referring to FIGS. 2 and 3, the merchandise detector 12 comprises a base in the form of a flexible printed circuit board (PCB) 14 that includes an elongate array of proximity sensors, which in the illustrated embodiment are a line of spaced apart photosensors in the form of reverse-biased light emitting diodes (LEDs) 16 that act as photodiodes. (The LEDs 16 are not shown on the PCB 14 in FIG. 3, but they are shown in FIG. 2.) However, different arrays and/or different proximity sensors can be used.

The LEDs 16 (or other proximity sensors) are connected to electronic circuitry (not shown) on the PCB 14, which also includes ancillary components for operation of the LEDs and the LEDs are configured to detect the presence or absence of objects on one side of the PCB 14—which is above the PCB, when installed.

The merchandise detector 12 is intended to be releasably fitted on top of a substrate such as a display shelf in a retail outlet and in order to hold the PCB 14 in place, the merchandise detector includes a flexible magnetic sheet 18 that covers the PCB and extends laterally beyond the edges of the PCB, so that it's overhang can attach magnetically to the shelf underneath it. Apertures 20 are defined longitudinally along the magnetic sheet 18 and are in register with the LEDs 16 and with the other electronic components fitted on the PCB 14.

In addition to the magnetic sheet 18, the merchandise detector 12 includes a flexible adhesive sheet 22 that extends over the magnetic sheet 18 with a lateral overhang that is attachable to the substrate with adhesive. Preferably, the adhesive on the underside of the adhesive sheet's 22 lateral overhangs is releasable, so that it can be released from the substrate and can be re-installed, without leaving a residue on the substrate and without damaging the substrate. Like the magnetic sheet 18, the adhesive sheet 22 defines a line of longitudinally spaced apertures 24 that are in register with the LEDs 16, but the apertures 22 in the illustrated example are only in register with the LEDs, not the other components on the PCB 14. Details of a product for which the merchandise detector 12 is intended to be used, are preferably printed on the adhesive sheet 22.

At a rear end 26 of the merchandise detector 12, the PCB 14 is connected to a back unit 28 (not shown in FIGS. 1 and 2, but shown in FIG. 3), which houses a transmitter and a receiver, as well as other components. The connection between the PCB 14 and back unit 28 is preferably by a flexible electrical conductor, although other electrical connections can be used. The flexible connection allows the back unit 28 to hang off the rear edge of a shelf, or to be folded in any direction, to prevent cluttering the top of the shelf with the rear unit.

A power source for the merchandise detector 12 in the form of a battery (or solar cell, or the like) is also housed in the back unit 18. In some embodiments, the back unit can include a visible indicator of battery functionality—e.g. an LED that illuminates if battery power is low—although this feature can be omitted.

Referring to FIG. 1, in use, a number of the merchandise detectors 12 are installed on a shelf 30 or other display substrates in a retail outlet. Preferably, the merchandise detectors 12 are installed so that their LEDs are generally aligned with predetermined merchandise positions or patterns of positions in which products are expected to be packed on the shelf 30. In a typical example (and as illustrated), products are packed in rows extending backwards from the front 32 of the shelf 30 and the merchandise detector 12 is installed on the shelf, where such a row of products is to be packed, with the back unit 28 extending over the rear 34 of the shelf. In such an installation, the front merchandise position in the row that can be detected by the LEDs 16, is the "facing" of the row (and this position should be occupied by a product as much as possible).

When products are placed on the merchandise detector 12 (e.g. when the shelf is stocked) or are removed (e.g. by a purchasing customer), the LEDs detect the presence and/or absence of the products in each of the individual positions in the row and each LED emits a detect signal confirming such presence or absence of products in its related position. The detect signals are relayed by the electronic circuitry on the PCB 14 and/or electronic circuitry in the back unit 28 and are transmitted by the transmitter in the back unit.

The transmitter can transmit the detect signals of each of the LEDs 16, unprocessed or part-processed, but in a preferred embodiment, the electronic circuitry of the merchandise detector 12 is configured to process the detect signals from each of the LEDs and compile a merchandise detector signal, which is transmitted. The merchandise detect signal comprises data of the number of products in the row on top of the merchandise detector 12, as well as which positions in the row are occupied by the products.

The signal transmitted by the transmitter of the merchandise detector 12 can be in any suitable format, but in a preferred embodiment of the invention, the transmitter is a radio transmitter and the signal is a radio signal.

The system 10 includes a number of routers 36 and each router includes a receiver and a transmitter. In the illustrated (preferred) embodiment, the router 36 includes an antenna 38 (for improved receipt and transmission of signals) and a solar panel, which provides adequate power to the router to be independent of external power sources. However, it is not essential that the router 36 has an external antenna or that it receives its power from a solar panel.

The system 10 also includes a coordinator 40 with a receiver and that is connectable to a computer 42.

The merchandise detect signals transmitted from the back units 28 of the merchandise detectors can be received by the receivers in adjacent back units 28 and can be re-transmitted. Similarly, the router 36 can receive the merchandise detect signals from the back units 28 or from other routers, and can re-transmit them. The signal transmission can be configured in various ways, but in a preferred embodiment, the back units 28 and routers 36 communicate in a wireless sensor network (WSN), which means that these devices act as nodes and establish a communication network among them, with one unit serving as a gateway device, that transmits all the data received from the network. Depending on size, layout and complexity of the system 10, one of the routers 36, or the coordinator 40 can serve as gateway device, or the computer 42 can serve as the gateway device.

Preferably, the gateway device receives the detect signals from the merchandise detectors 12 (directly or via the WSN) and compiles a merchandise data signal. In the computer, merchandise data is compiled from the merchandise data signal and the merchandise data includes the presence or absence of products in each merchandise position in each row above each merchandise detector 12. Accordingly, if a retail outlet is comprehensively fitted with merchandise detectors 12 below each row of merchandise positions, the merchandise data includes a complete indication of the status of merchandise in the retail outlet—including not only stock levels, but also an indication of stock positions on shelves—including where facings are not full enough to maintain a desired customer experience.

The merchandise data can be processed in the computer 42 and/or can be transmitted via a communications network, such as a LAN, WAN or the internet, to other computers in the system 10 and the other computers can be remote from the retail outlet, e.g. they can include a remote server, a computer in a distribution centre or warehouse, a computer of a supplier, or the like. The merchandise data can be processed in various ways, including: processing in the computer 42; transmitting in processed, part-processed or un-processed form; processing to generate prompts or alerts; displaying the data or prompts/alerts on a user interface; storing the data or prompts/alerts; or the like.

The system 10 can be implemented in a single retail outlet, but can also be implemented on a larger scale, which can include multiple retail outlets, distribution centres, warehouses, remote offices, suppliers, and the like. The system 10 can accumulate all the merchandise data centrally, e.g. on a single computer or server, or the merchandise data can be disseminated to different computers in the system. Likewise, software that is required to operate the system can run on individual computers, or on a server, or can comprise a combination of server (back-end) software and user (front-end) software.

In a preferred embodiment, each user of the system 10 logs into the system on a computer of the system and is allowed access to merchandise data collected by the computers 42 in the relevant retail outlets. Depending on the identity of the user, his access may be restricted to merchandise data relating to only specific retail outlets, only products supplied by a certain supplier, etc.

The merchandise data that is made available to the user is preferably tailored for his particular needs, but data is typically listed per stock keeping unit (SKU) and the SKUs that are viewed by the user on-screen (or in any other user interface) are typically limited by selected filters such as: countries; regions; towns; retailers; branches, stores, distribution centres; product categories; planogram drop identities; planogram shelf identities; brand owners; brands, etc.

For each SKU, the software can calculate from the merchandise data and display, the stock level, an assessment of stock placement in the selected retail outlet, and the most recent events of dispensing a product of the SKU or restocking it. All of these data may also include prompts/alerts, e.g. low stock levels, poor stock placement, non-moving stock, or overdue replenishments can be brought to the user's attention by prompts. The prompts/alerts can also be configured to be communicated to the user by push communications, e.g. by alerting him via email, SMS or other communication and the limits for generating a prompt/alert can be set by the user.

For each SKU, the system 10 can also display to the user, properties of the SKU, e.g. stock level history, dispense history, replenishment history, prompt/alert history, history of merchandise detectors 12 used for the SKU.

The stock placement of each SKU can be shown to the user in detail, confirming whether or not each position for products of the SKU are filled on the shelf 30.

The system 10 allows retailers at various levels in a retail organisation, as well as persons in retail supply chains, access to comprehensive data relating to merchandise in retail outlets, which allows them to manage inventories effectively. In addition, the system 10 does not require power supplied to any of the in-store components, apart from the computer 42 (which also powers the coordinator 40) and each of the merchandise detectors 12, routers 36 and coordinator 40 communicate wirelessly, so that no wiring is required in the system 10.

The invention claimed is:

1. An inventory monitoring system which comprises:
    a plurality of merchandise detectors, each of said merchandise detectors being fitted on top of a substrate and comprising at least one elongate array of photosensors and a magnetic element configured to releasably secure the at least one elongate array of photosensors to the substrate, each photosensor of said at least one elongate array of photosensors being a reverse-biased light emitting diode (LED) that acts as a photodiode, each photosensor configured to detect a presence or absence of products based on proximity of one of the products in a predetermined merchandise position above the merchandise detector interfering with detection of environmental lighting detection by at least one photosensor of said at least one elongate array of photosensors and to emit a detect signal confirming such presence or absence, and each of said merchandise detectors including a transmitter connected to the photosensors and configured to transmit the detect signal; and
    at least one gateway device with a receiver that is configured to receive the detect signals from the merchandise detectors, and a transmitter that is configured to compile a merchandise data signal from the detect signals, and to transmit said merchandise data signal.

2. The inventory monitoring system according to claim 1, wherein the photosensors in the elongate array in each merchandise detector form a line of spaced apart photosensors.

3. The inventory monitoring system according to claim 1, wherein each merchandise detector includes a receiver that is configured to receive detect signals from other of said merchandise detectors;
    said gateway device and merchandise detectors being configured to communicate with one another as a wireless sensor network.

4. The inventory monitoring system according to claim 1, wherein each of said photosensors is a photodiode.

5. The inventory monitoring system according to claim 1, wherein each of said merchandise detectors includes a power source.

6. The inventory monitoring system according to claim 1, wherein each of said plurality of merchandise detectors further comprises a base layer supporting said at least one elongate array of photosensors.

7. The inventory monitoring system according to claim 6, wherein said magnetic element is a magnetic flexible sheet configured to cover at least a portion of said base layer.

8. The inventory monitoring system according to claim 1, wherein the plurality of merchandise detectors and the at least one gateway device communicate wirelessly.

9. The inventory monitoring system according to claim 1 further comprising a central inventory computer configured to collect inventory data based on at least one merchandise signal.

10. A merchandise detector which comprises:
a base layer;
a plurality of photosensors fitted on the base layer in an elongate array, each photosensor being a reverse-biased light emitting diode (LED) that acts as a photodiode, each said photosensor being configured to detect a presence or absence of an object on one side of the base layer and to emit a detect signal confirming such presence or absence by the object interfering with detection of environmental lighting detection by said at least one of said plurality of photosensors;
a magnetic element configured to releasably secure said base layer to a surface;
electronic circuitry connected to the photosensors to receive the detect signals from the photosensors; and
a transmitter connected to the electronic circuitry and configured to transmit the detect signals.

11. The merchandise detector according to claim 10, wherein the transmitter is a radio transmitter.

12. The merchandise detector according to claim 10, wherein said magnetic element is a magnetic flexible sheet configured to cover at least a portion of said base layer.

13. The merchandise detector according to claim 10, wherein the electronic circuitry is configured to compile a merchandise detector signal from the detect signals, said merchandise detector signal comprising data including the presence or absence of products in each of the merchandise positions, and to transmit the detect signals in the form of the compiled merchandise detector signal.

14. The merchandise detector according to claim 10, wherein the photosensors in the elongate array form a line of spaced apart photosensors.

15. The merchandise detector according to claim 10, wherein each of said photosensors is a photodiode.

16. The merchandise detector according to claim 10, which includes a power source.

17. A method of inventory management, said method comprising:

releasably attaching a plurality of merchandise detectors magnetically on top of at least one substrate, each of said merchandise detectors comprising at least one elongate array of photosensors, each photosensor of said at least one elongate array of photosensors being a reverse-biased light emitting diode (LED) that acts as a photodiode, each photosensor configured to detect a presence or absence of the products based on proximity of one of the products in a predetermined merchandise position above the merchandise detector by one of the products interfering with detection of environmental lighting detection by said at least one of said plurality of merchandise detectors;

monitoring the presence or absence of products in the predetermined merchandise positions, in the merchandise detectors;

emitting a detect signal from each merchandise detector, said detect signal confirming such presence or absence of products in each of the merchandise positions;

receiving the detect signals from the merchandise detectors in at least one gateway device;

compiling a merchandise data signal from the detect signals, said merchandise data signal including the presence or absence of products in each of the merchandise positions;

transmitting the merchandise data signal from the gateway device; and receiving said merchandise data signal in at least one computer.

18. The method according to claim 17, in which the photosensors in at least some of the merchandise detectors form a line of spaced apart photosensors and which includes monitoring the presence or absence of products in an elongate array of the predetermined merchandise positions, in said merchandise detectors.

19. The method according to claim 17, wherein the gateway device and merchandise detectors communicate with one another as a wireless sensor network.

20. The method according to claim 17, which includes compiling merchandise data from the merchandise data signal, and displaying said merchandise data on a user interface.

21. The method according to claim 17, which includes compiling merchandise data from the merchandise data signal, and processing said merchandise data to generate prompts.

22. The method according to claim 17, which includes providing electrical power to each merchandise detector from a power source within the merchandise detector.

23. The method according to claim 17, wherein releasably attaching each of the plurality of merchandise detectors to the substrate includes positioning a magnetic flexible sheet at least partly over a base layer of each merchandise detector.

* * * * *